(12) United States Patent  
Gonzalez et al.

(10) Patent No.: US 12,450,427 B2
(45) Date of Patent: Oct. 21, 2025

(54) INTERACTIVE FORM EDITOR WITH CONCURRENT AUTOMATIC CREATION OF SCHEMA FILES

(71) Applicant: Treasure Data, Inc., Mountain View, CA (US)

(72) Inventors: William Gonzalez, Lemoore, CA (US); Jennifer Lai, Seattle, WA (US)

(73) Assignee: Treasure Data, Inc., Mountain View, CA (US)

( * ) Notice: Subject to any disclaimer, the term of this patent is extended or adjusted under 35 U.S.C. 154(b) by 0 days.

(21) Appl. No.: 18/341,221

(22) Filed: Jun. 26, 2023

(65) Prior Publication Data

US 2024/0020466 A1    Jan. 18, 2024

Related U.S. Application Data

(60) Provisional application No. 63/389,293, filed on Jul. 14, 2022.

(51) Int. Cl.
  *G06F 40/186* (2020.01)
  *G06F 40/123* (2020.01)
  (Continued)

(52) U.S. Cl.
  CPC .......... *G06F 40/186* (2020.01); *G06F 40/123* (2020.01); *G06F 40/174* (2020.01); *G06F 3/0486* (2013.01)

(58) Field of Classification Search
  CPC .... G06F 40/186; G06F 40/123; G06F 40/174; G06F 3/0486
  See application file for complete search history.

(56) References Cited

U.S. PATENT DOCUMENTS

| | | | |
|---|---|---|---|
| 7,370,315 B1 * | 5/2008 | Lovell | G06F 8/355 717/109 |
| 2007/0005634 A1 | 1/2007 | Selca et al. | |

(Continued)

OTHER PUBLICATIONS

International Search Authority, International Search Report and Written Opinion for Int'l Application No. PCT/US2023/069770, mailed Nov. 8, 2023, 10 pages.

(Continued)

*Primary Examiner* — Andrey Belousov
(74) *Attorney, Agent, or Firm* — Baker Botts L.L.P.

(57) ABSTRACT

A computer-implemented method executed by one or more computing devices executing one or more sequences of stored program instructions, the computer-implemented method comprising initiating execution of an interactive form editor and presenting a graphical user interface and a concurrent display of three or more windows corresponding to a form, data schema, user interface schema, field attributes, and field templates; receiving first input specifying to drag and drop two or more data entry fields into two or more pages of a multipage form; automatically concurrently updating a data schema window with data schema code corresponding to the two or more data entry fields; receiving second input, and in response thereto, exporting the data schema code to a digital file in a digital data storage system; receiving third input, and in response thereto, copying the data schema code to a configuration file and adding the configuration file to a digitally stored package; uploading the digitally stored package to a shared filesystem.

26 Claims, 11 Drawing Sheets

(51) Int. Cl.
    *G06F 40/174*     (2020.01)
    *G06F 3/0486*     (2013.01)

(56)                References Cited

U.S. PATENT DOCUMENTS

| | | |
|---|---|---|
| 2007/0124665 A1 | 5/2007 | Jensen et al. |
| 2013/0268834 A1 | 10/2013 | Krane et al. |
| 2019/0147028 A1 | 5/2019 | Hare et al. |
| 2019/0303430 A1 | 10/2019 | Cockerham et al. |
| 2019/0370320 A1 | 12/2019 | Kalra |
| 2020/0257759 A1 | 8/2020 | Ptaszynski et al. |
| 2021/0149645 A1* | 5/2021 | Kang ................... H04L 67/131 |
| 2022/0253595 A1 | 8/2022 | Staley et al. |

OTHER PUBLICATIONS

Simin Baharlou, International Preliminary Report on Patentablity, Application No. PCT/US2023/069770, dated Jan. 23, 2025, 7 pages, pub. by The International Bureau of WIPO, Geneva, Switzerland.

* cited by examiner

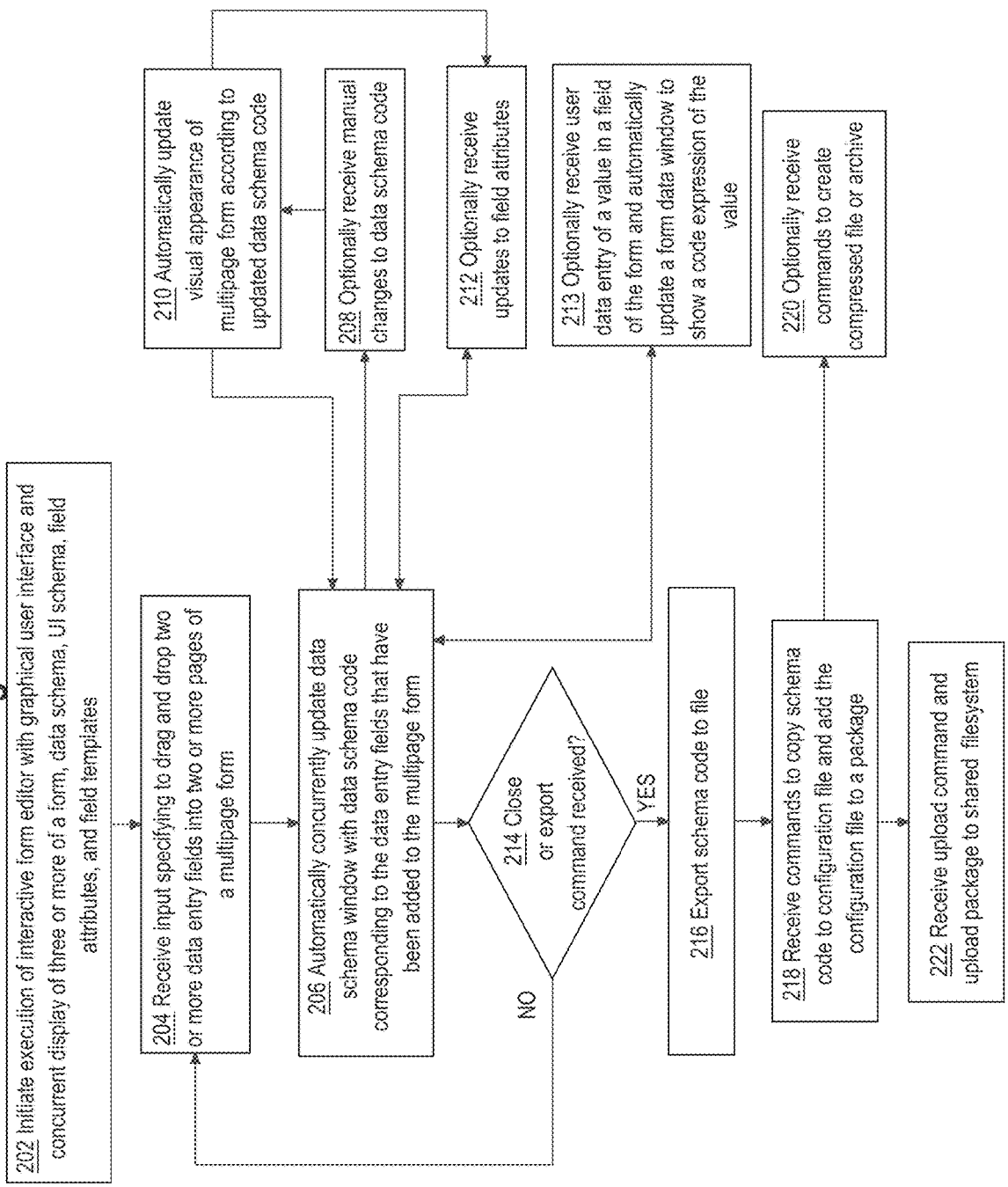

INTERACTIVE FORM EDITOR WITH CONCURRENT AUTOMATIC CREATION OF SCHEMA FILES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022 Treasure Data, Inc.

TECHNICAL FIELD

One technical field of the present disclosure is data-driven forms that support user interaction with large-scale relational database systems. Another technical field is visual, graphical, interactive computer-implemented interface design tools.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digital relational databases now are widely used to store, manage, and control the flow of information in business enterprises, with integration into a variety of practical applications. One example application is employee expense management. In many business enterprises, employees or contractors incur external expenses in the course and scope of employment and are entitled to reimbursement, from the enterprise, for those expenses. To manage the collection, review, and approval of expense information, enterprises use expense management software, linked to relational databases.

Visual, graphical, and interactive forms can be programmed as elements of the front end of such databases. Users of instances of databases may wish to define their own forms to adapt the database system to the particular requirements of a business, product, or service. To date, defining such forms often has required custom programming or knowledge of schema definitions and languages. Non-technical users may find understanding the underlying schema definition of a form to be difficult. Therefore, there is an acute need in the field of database applications for improved computer-implemented methods by which non-technical users can create user interface forms that still conform to an established data schema.

SUMMARY

The appended claims may serve as a summary of the invention.

BRIEF DESCRIPTION OF THE DRAWINGS

In the Drawings:

FIG. 2 is a flow diagram of a computer-implemented process or algorithm that can be programmed as part of one embodiment.

DETAILED DESCRIPTION

Figure 1:
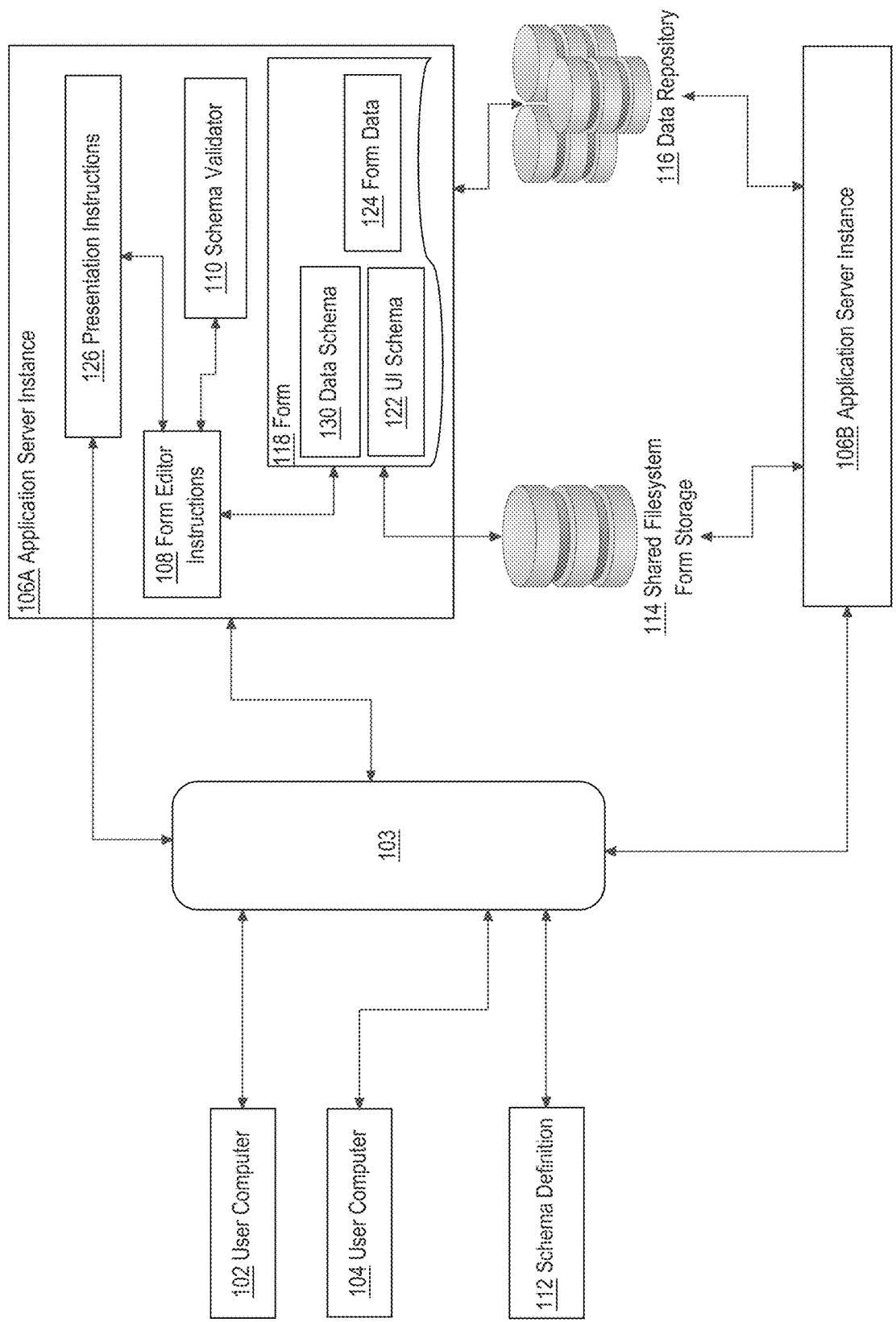
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

1. General Overview

In an embodiment, a computer user can cause concurrent updates to a data schema and a user interface schema while visually creating a form for a database application by dragging and dropping data fields into the form, thereby associating fields of different types and having different attributes with the form, and while automatically generating a preview representation of the data that an end user would enter into the form at runtime. The concurrent creation of four kinds of data—the data schema, the user interface schema, an association of data field types with a form, and a representation of entered data—represents a departure from past practice and one aspect of the inventive contribution that the inventor conceived in an inventive moment, as does the combination of views of these four classes of data in a single user interface.

As further described in other sections herein, in an embodiment, an interactive form editor can be programmed with a new combination of:
1. Dynamic layout which allows users to expand and collapse the various panels
2. JSON schema code editor
3. UI schema code editor
4. Unified schema code editor
5. Form data preview
6. Live form renderer preview
7. Attributes panel for the interactive mode In an embodiment, depending on the configuration, the user may actively toggle between supported code editor languages (JSON or YAML), view the split schema or the unified schema, configure a single page form modal or a multipage form modal, and toggle between editing the form via the code editors or the interactive builder. In an embodiment, in the code editor mode, the user manually edits each schema and any updates are synchronized automatically to the visual form to render a live preview of the form as it will appear at runtime when used with the database application. The user can fully customize the form in this manner and export the code. In the interactive editor, the user can drag and drop pre-configured schema templates into the modal to build the form. They can edit schema attributes via the UI. The user can fully customize the form in this manner and export the code. Any changes in this mode are synchronized to render the live preview.

The user also has the option to toggle between editing modes to make modifications. Any changes in either mode are bilateral and update the appropriate UI fields in a live and responsive way. Advanced users may edit a form using both methods, the iterative mode for an easy configuration and then switch to the editor mode to make any advanced configurations that drag-and-drop may not currently support.

The multipage form builder is an extension of the single-page form but generates the unified schema with nested page objects. This allows the user to define each page using the code editor or the interactive editor.

Embodiments encompass the subject matter of the following numbered clauses:

1. A computer-implemented method executed by one or more computing devices executing one or more sequences of stored program instructions, the computer-implemented method comprising: initiating execution of an interactive form editor and presenting a graphical user interface and a concurrent display of three or more windows corresponding to a form, data schema, user interface schema, field attributes, and field templates; receiving first input specifying to drag and drop two or more data entry fields into two or more pages of a multipage form; automatically concurrently updating a data schema window with data schema code corresponding to the two or more data entry fields; receiving second input, and in response thereto, exporting the data schema code to a digital file in a digital data storage system; receiving third input, and in response thereto, copying the data schema code to a configuration file and adding the configuration file to a digitally stored package; uploading the digitally stored package to a shared filesystem.

2. The computer-implemented method of clause 1, the second input comprising a close command or an export command.

3. The computer-implemented method of clause 1, the third input comprising a command to copy the schema code.

4. The computer-implemented method of clause 1, further comprising, asynchronously with respect to the updating of the data schema window, receiving manual changes to the data schema code, and in response thereto, automatically updating a visual appearance of the multipage form according to updated data schema code.

5. The computer-implemented method of clause 1, further comprising, asynchronously with respect to the updating of the data schema window, receiving updates to the field attributes, and in response thereto, automatically updating a visual appearance of the multipage form according to updated data schema code.

6. The computer-implemented method of clause 1, further comprising, asynchronously with respect to the updating of the data schema window, receiving fourth input comprising a data entry of a value in a field of the multipage form, and in response thereto, automatically updating a form data window to show a code expression of the value.

7. The computer-implemented method of clause 1, wherein the multipage form comprises at least the data schema, the user interface schema, and form data.

8. The computer-implemented method of clause 1, further comprising adding a new field to the multipage form by receiving input specifying dragging a template identifier from a template panel and dropping the template identifier on a page of the multipage form, and in response, automatically displaying a default name of the new field in the multipage form and a graphical widget in which data entry can be accepted.

9. The computer-implemented method of clause 1, further comprising: digitally storing data schema code and user interface (UI) schema code in main memory in backing stores for the data schema window and UI schema window; hiding, from the interactive form editor, the data schema window and the UI schema window while updating the data schema code and UI schema code in storage in real-time without user involvement.

10. The computer-implemented method of clause 1, further comprising executing converse updates of the multipage form and its visual appearance in response to a fourth input specifying an edit or a change to data schema code or UI schema code shown in the data schema window or UI schema window.

11. The computer-implemented method of clause 1, further comprising: displaying, near the multipage form, a plurality of toggle widgets that are programmed to respond to a fourth input to specify displaying code using JSON or YAML, without an interactive editor display; in response to the fourth input a JSON control or a YAML control, closing a visual display of the form, field attributes, form fields, and form data, opening editors for data schema code corresponding to the data schema window, using JSON syntax or YAML syntax.

12. The computer-implemented method of clause 1, wherein each data field in the multipage form has a plurality of digitally stored attributes comprising at least an internal field name, a screen name or display name of the data field, and one or more properties or constraints.

13. The computer-implemented method of clause 1, further comprising receiving fourth input to specify dragging and dropping a field template from a template panel to the multipage form; in response thereto, automatically instantiating a field definition in data schema code in the data schema window, including automatically copying one or more default attributes of the field template into the data schema code.

14. The computer-implemented method of clause 13, further comprising receiving fifth input specifying selecting a field corresponding to the field definition, accessing a field attributes panel, and modifying one or more attributes of the field; automatically concurrently updating a visual appearance of the field in the multipage form, in the data schema code in the data schema window, and UI schema code in the UI schema.

15. One or more non-transitory computer-readable storage media storing one or more sequences of instructions which, when executed using one or more processors, cause the one or more processors to execute a computer-implemented method of: initiating execution of an interactive form editor and presenting a graphical user interface and a concurrent display of three or more windows corresponding to a form, data schema, user interface schema, field attributes, and field templates; receiving first input specifying to drag and drop two or more data entry fields into two or more pages of a multipage form; automatically concurrently updating a data schema window with data schema code corresponding to the two or more data entry fields; receiving second input, and in response thereto, exporting the data schema code to a digital file in a digital data storage system; receiving third input, and in response thereto, copying the data schema code to a configuration file and adding the configuration file to a digitally stored package; uploading the digitally stored package to a shared filesystem.

16. The non-transitory computer-readable storage media of clause 15, the second input comprising a close command or an export command.

17. The non-transitory computer-readable storage media of clause 15, the third input comprising a command to copy the schema code.

18. The non-transitory computer-readable storage media of clause 15, further comprising sequences of instructions which, when executed using one or more processors, cause the one or more processors to execute, asynchronously with respect to the updating of the data schema window, receiving manual changes to the data schema code, and in response thereto, automatically updating a visual appearance the multipage form according to updated data schema code.

19. The non-transitory computer-readable storage media of clause 15, further comprising sequences of instructions which, when executed using one or more processors, cause the one or more processors to execute, asynchronously with respect to the updating of the data schema window, receiving updates to the field attributes, and in response thereto, automatically updating a visual appearance the multipage form according to updated data schema code.

20. The non-transitory computer-readable storage media of clause 15, further comprising sequences of instructions which, when executed using one or more processors, cause the one or more processors to execute, asynchronously with respect to the updating of the data schema window, receiving fourth input comprising a data entry of a value in a field of the multipage form, and in response thereto, automatically updating a form data window to show a code expression of the value.

21. The non-transitory computer-readable storage media of clause 15, wherein the multipage form comprises at least the data schema, the user interface schema, and form data.

22. The non-transitory computer-readable storage media of clause 15, further comprising sequences of instructions which, when executed using one or more processors, cause the one or more processors to execute adding a new field to the multipage form by receiving input specifying dragging a template identifier from a template panel and dropping the template identifier on a page of the multipage form, and in response, automatically displaying a default name of the new field in the multipage form and a graphical widget in which data entry can be accepted.

23. The non-transitory computer-readable storage media of clause 15, further comprising sequences of instructions which, when executed using one or more processors, cause the one or more processors to execute: digitally storing data schema code and user interface (UI) schema code in main memory in backing stores for the data schema window and UI schema window; hiding, from the interactive form editor, the data schema window and the UI schema window while updating the data schema code and UI schema code in storage in real-time without user involvement.

24. The non-transitory computer-readable storage media of clause 15, further comprising sequences of instructions which, when executed using one or more processors, cause the one or more processors to execute converse updates of the multipage form and its visual appearance in response to a fourth input specifying an edit or a change to data schema code or UI schema code shown in the data schema window or UI schema window.

25. The non-transitory computer-readable storage media of clause 15, further comprising sequences of instructions which, when executed using one or more processors, cause the one or more processors to execute: displaying, near the multipage form, a plurality of toggle widgets that are programmed to respond to a fourth input to specify displaying code using JSON or YAML, without an interactive editor display; in response to the fourth input a JSON control or a YAML control, closing a visual display of the form, field attributes, form fields, and form data, opening editors for data schema code corresponding to the data schema window, using JSON syntax or YAML syntax.

26. The non-transitory computer-readable storage media of clause 15, wherein each data field in the multipage form has a plurality of digitally stored attributes comprising at least an internal field name, a screen name or display name of the data field, and one or more properties or constraints.

27. The non-transitory computer-readable storage media of clause 15, further comprising sequences of instructions which, when executed using one or more processors, cause the one or more processors to execute: receiving fourth input to specify dragging and dropping a field template from a template panel to the multipage form; in response thereto, automatically instantiating a field definition in data schema code in the data schema window, including automatically copying one or more default attributes of the field template into the data schema code.

28. The non-transitory computer-readable storage media of clause 27, further comprising sequences of instructions which, when executed using one or more processors, cause the one or more processors to execute: receiving fifth input specifying selecting a field corresponding to the field definition, accessing a field attributes panel, and modifying one or more attributes of the field; automatically concurrently updating a visual appearance of the field in the multipage form, in the data schema code in the data schema window, and UI schema code in the UI schema.

2. Structural & Functional Overview

Certain commercially available software-as-a-service (SaaS) database applications include computer-supported facilities by which end users can create digital assets that can be installed in an instance of the database application and that unrelated end users may find useful. Digital assets can comprise forms, files, images, or other elements. The purpose of creating new digital assets can be to extend the database application or to share new forms for particular domains or industries that other users might find useful.

Typically the forms and files are digitally contributed to or stored in a shared filesystem that other users can execute online using a browser; thus, a first user having a license to a first instance of a database application can create and store a form, or a package that includes a form, in a virtual marketplace of packages, files, and forms, and an unrelated second user can access the virtual marketplace to download and install a package and its constituent elements in the second user's instance of the same database application. An example is TREASURE DATA MARKETPLACE, which is commercially available from Treasure Data, Inc. A marketplace can offer downloads of packages free, or for a fee.

With this approach, a user or developer typically creates a form as part of a larger package, which includes other files, code, or images stored together in an archive or other collective file. When end users download and install a package, the form becomes available and can be opened or instantiated and used. Forms can specify input data that an end user must supply to cause successful installation; for example, a form could contain input data fields for application programming interface (API) keys, data table names, or other installation information. A package could define a data analytics dashboard having specified graphs, charts, or other information displays; a form in the package could contain input data fields for an API key, source tables, and the identification of data to be analyzed.

In some such systems, forms that users contribute must conform to a specified format or configuration. For example, data-driven forms may need to conform to a published schema, such as the JSON schema described at the online domain "j son-schema.org." The developers can be any end user of the database application. End users may be employees of customers of a manufacturer, vendor, or licensor of the database application. Some end users may have extensive technical knowledge and can create forms using a code editor outside of the user interface of the database application or the shared filesystem. However, developers may not have extensive technical knowledge or education. According to an embodiment, an interactive form editor is programmed to accept visual, graphical user input, such as drag-and-drop commands using a pointing device, to create a form in response, and to concurrently automatically create a schema definition for the form. In some embodiments, the interactive form and schema can be displayed side-by-side and viewed or edited alternatively, with changes to one automatically updating the other. This process can be termed, for example, bidirectional editing. Therefore, the user can preview the form as it is created. In an embodiment, the schema is validated automatically as a form is created. Consequently, developers can create and store correct, workable forms without having to manually create, edit, or modify form code. Furthermore, with validation functions, embodiments can automatically enforce quality controls on forms to ensure that the forms will work when other users download and install the forms.

FIG. 1 illustrates a distributed computer system showing the context of use and principal functional elements with which one embodiment could be implemented.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 and the other drawing figures and all of the descriptions and claims in this disclosure are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In an embodiment, a plurality of user computers 102, 104 are communicatively coupled using a data communications network 103 to two or more application server instances 106A, 106B, each of which is coupled to a shared filesystem of form storage 114 and a data repository 116. Each of the user computers 102, 104 can comprise a desktop computer, workstation, laptop computer, tablet computer, mobile computing device, or smartphone. Each of the user computers 102, 104 can comprise the hardware components and architecture shown in FIG. 9, which is described in other sections herein. Each of the user computers 102, 104 typically hosts an operating system, one or more application programs such as business or personal productivity applications, and an internet browser like FIREFOX, DUCKDUCKGO, EDGE, CHROME, or SAFARI.

Network 103 broadly represents one or more local area networks, wide area networks, campus networks, internetworks, or a combination thereof, including but not limited to the public internet.

Each of the application server instances 106A, 106B can comprise a computer, processor cluster, or virtual machine instance in an enterprise facility, private data center, public data center, or online cloud computing facility such as AMAZON AWS, MICROSOFT AZURE, and the like. For purposes of illustrating a clear example, assume that each of the application server instances 106A, 106B is associated with a different enterprise, user, or licensee, and that user computer 102 accesses and uses only application server instance 106A and user computer 104 accesses and uses only application server instance 106B. With this architecture, the application server instances 106A, 106B can be coupled to shared multi-tenant storage in the form of a data repository 116, which can enforce tenant-specific security controls to ensure that only an authorized user computer can create, read, update, or delete data pertaining to the instance with which that user computer is associated.

Each of the application server instances 106A, 106B typically hosts an instance of a software-as-a-service (SaaS) application, such as a database application, although the specific application program can vary in different embodiments and can be compatible with any domain, industry, or field, such as finance, education, healthcare, manufacturing, and others. For clarity the SaaS application hosted with the application server instances 106A, 106B is omitted from FIG. 1. The functional elements of application server instances 106A, 106B relevant to this disclosure can comprise form editor instructions 108, schema validator 110, and presentation instructions 126. These elements are shown, as an example, in application server instance 106A. The functional elements are programmed to interoperate to facilitate creating one or more forms 118 and storing the forms in shared filesystem form storage 114; using shared storage, a first user computer 102 associated with a first application server instance 106A can create form 118 and store it, and a second user computer 104 can download and install the form against the second application server instance 106B. In this manner, the shared filesystem form storage 114 can implement a shared marketplace that can host forms, packages, files, or other resources that a community of computer users contributes, for downloading, installation, and use by other users or their computers.

In an embodiment, form 118 comprises a digitally stored association of data schema 130 and a user interface (UI) schema 122. During the process of creating form 118, as further described in other sections herein, and at runtime when the form is used, user input to data fields of a form can result in creating and storing form data 124 in association with the form. As further described, when form 118 is edited, in a preview mode, a user can enter data into fields of the form, resulting in a display of form data 124. At runtime, when form 118 is used in connection with one of the application server instances 106A, 106B, the form data 124 is created and transiently stored in main memory from which it can be posted to the data repository using, for example, a parameterized HTTP POST request in which the form data comprises a payload.

In some embodiments, developers define a package for execution using TERRAFORM from AMAZON. In one embodiment, a package comprises a set of configuration data conforming to YAML, a specification of one or more workflows, and form 118. Or, a package contains JSON, a file specifying a workflow of visualization or other processing, and a specification of transformations of data from the multipage form to the workflow. In an embodiment, the data schema 130 of each form 118 conforms to schema definition 112, which can be stored using a networked server or storage device that the application server instances 106A, 106B can access via network 103. The schema validator 110 can be programmed to generate the data schema 130 as the form 118 is created, to ensure that the data schema confirms to the schema definition 112. In an embodiment, the schema definition 112 is a JSON data-driven form schema of the type documented at the time of this writing in files in the domain "json-schema.org" on the public internet.

The architectural description of FIG. 1 and the functional description of computer system 100 and its functional elements in this disclosure primarily focus on a form editing mode, stage, or phase in which a user computer 102 can provide visual, drag-and-drop input to define the form 118, automatically generate code representing the form, and store the form as part of a larger package stored in the shared filesystem form storage 114. After form 118 is created using form editor instructions 108 and the techniques herein, the same user computer 102 or a different user computer 104 can install the form, and other elements of a package that includes the form, in or against one of the application server instances 106A, 106B. Via installation, form 118 becomes available for use with that instance and data in the data repository 116 pertaining to that instance. The post-installation mode, stage, or phase of use is termed runtime in this disclosure. Each of the application server instances 106A, 106B can include functional elements not shown in FIG. 1 to load, execute, and render the form 118 at runtime. For example, a set of front-end rendering instructions can be programmed to read form 118, parse the code of the data schema and/or UI schema, and visually render the form to the user computer 104 for interactive use.

FIG. 2 is a flow diagram of a computer-implemented process or algorithm that can be programmed as part of one embodiment. FIG. 2 and each other flow diagram herein are intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program, but are provided at the same functional level of illustration that is normally used at the high level of skill in this art to communicate the basis of developing working programs.

At block 202, the process is programmed to initiate the execution of an interactive form editor having a graphical user interface and a concurrent display of three or more of a form, data schema, user interface schema, field attributes, and field templates.

At block 204, the process is programmed to receive input specifying to drag and drop two or more data entry fields into two or more pages of a multipage form. At block 206, the process is programmed to automatically concurrently update a data schema window with data schema code corresponding to the data entry fields that have been added to the multipage form.

At block 208, the process is programmed to optionally receive manual changes to the code of the data schema. At block 210, the process is programmed to automatically update the visual appearance of the multipage form according to the updated data schema code. In one embodiment, the rendering engine "react-jsonschema-form" can be used to update the visual appearance of the multipage form; the rendering engine receives the data schema code and code for the user interface schema as input and generates a visualization of the form. The cited rendering engine is available, at the time of this writing, in the folder or directory "rjsf-team" of the GITHUB service on the public internet.

At block 212, the process is programmed to optionally receive updates to field attributes. At block 213, the process is programmed to optionally receive user data entry of a value in a field of the form and automatically update a form data window to show a code expression of the value, thus implementing a preview mode for data values that could be entered in fields of the form at runtime. Any of blocks 208, 210, 212, 213 can be executed asynchronously in response to user input whenever a form is undergoing creation or definition.

At block 214, the process is programmed to determine whether a close or export command has been received. If not, then control transfers to block 204, thus forming a loop in which the process can receive further input to drag and drop other fields into the form, perform automatic updates to windows for a data schema and other windows as needed, receive updates to field attributes, receive changes to code of the data schema, and automatically update the visual appearance again. In this manner, blocks 204, 206, 208, 210, 212, 213 214 enable continuous concurrent bidirectional updating of a multipart visual form and the schema definitions for data and UI features of the form without requiring the end user to manually edit code. Instead, drag-and-drop operations can be used to create fields in a form and adjust field attributes, in response to which the process automatically generates and/or updates correct code for a data schema and UI schema, or for a unified schema, as further described in other sections. Updates in either the code or the visual format are synchronized across the editor and shown in a live preview at the time that the form is edited. Embodiments also offer previews of how an encoded payload of data values will be formed at runtime when data values are entered in the form.

At block 216, the process is programmed to export the data schema code to a file. For example, after a multipage form is complete, the user can select an EXPORT DATA option or the equivalent from among controls in the graphical user interface. In response, the form editor can be programmed to cause copying JSON code shown in a data schema window to a clipboard or scratchpad memory of the user computer 102. The user then can paste a copy of the same code into a configuration file and bind the configuration file to a package that the user of 35 uploads to the shared filesystem. These steps also can execute automatically under the control of a script, workflow, or stored control program.

At block 218, the process is programmed to receive commands to copy the data schema code to a configuration file and add the configuration file to a package. At block 220, the process is programmed to receive commands to create a compressed file or archive, although the use of an archive or compressed file is not required. At block 222, the process is programmed to receive an upload command and upload a package to a shared filesystem.

Figure 3A:
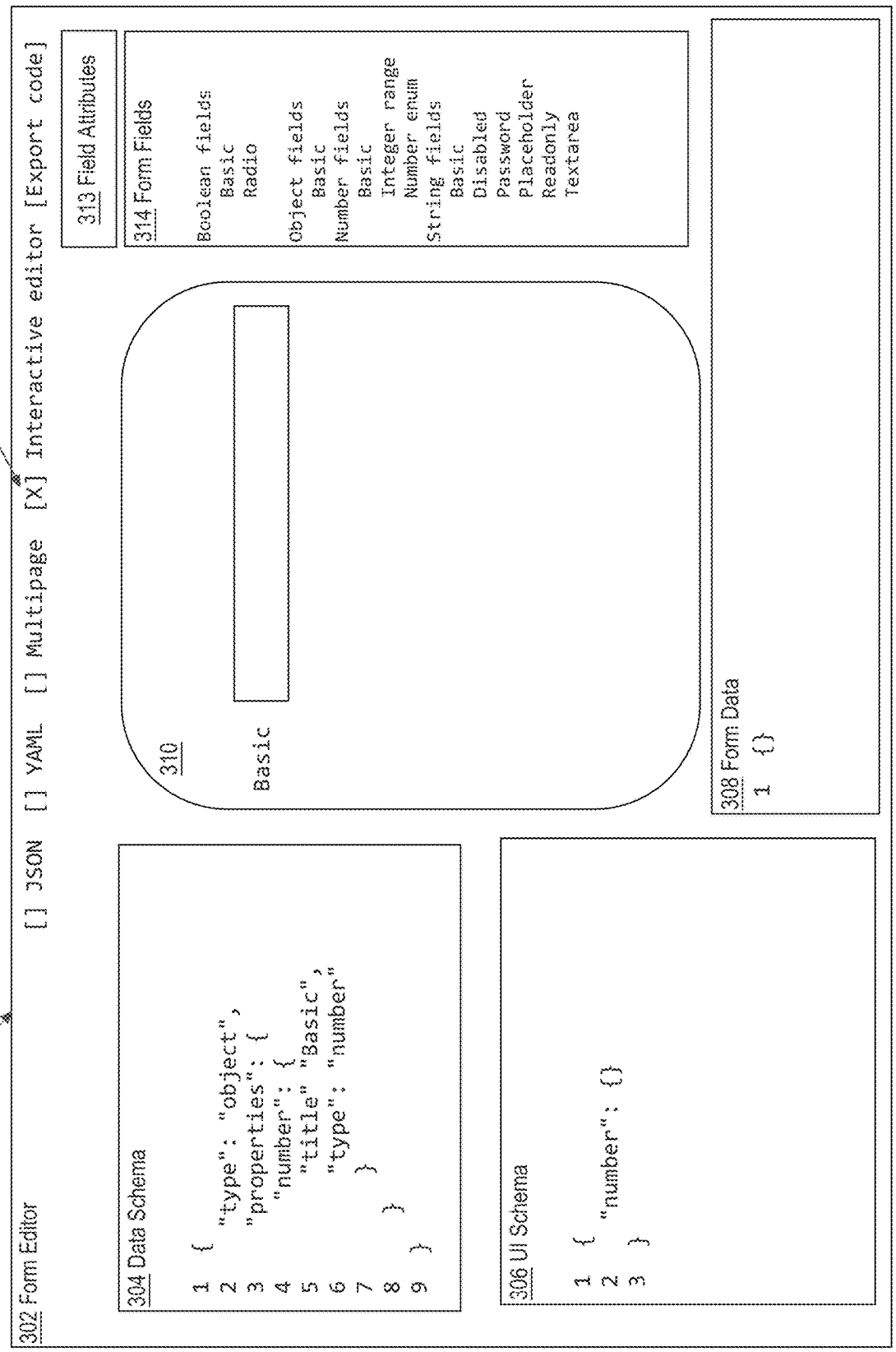
FIG. 3A illustrates an example computer display device that has rendered and displayed a graphical user interface, shown in schematic form, providing a form editor with the concurrent display of a form visualization, data schema, user interface (UI) schema, form data, field attributes, and form fields.
Figure 3B:
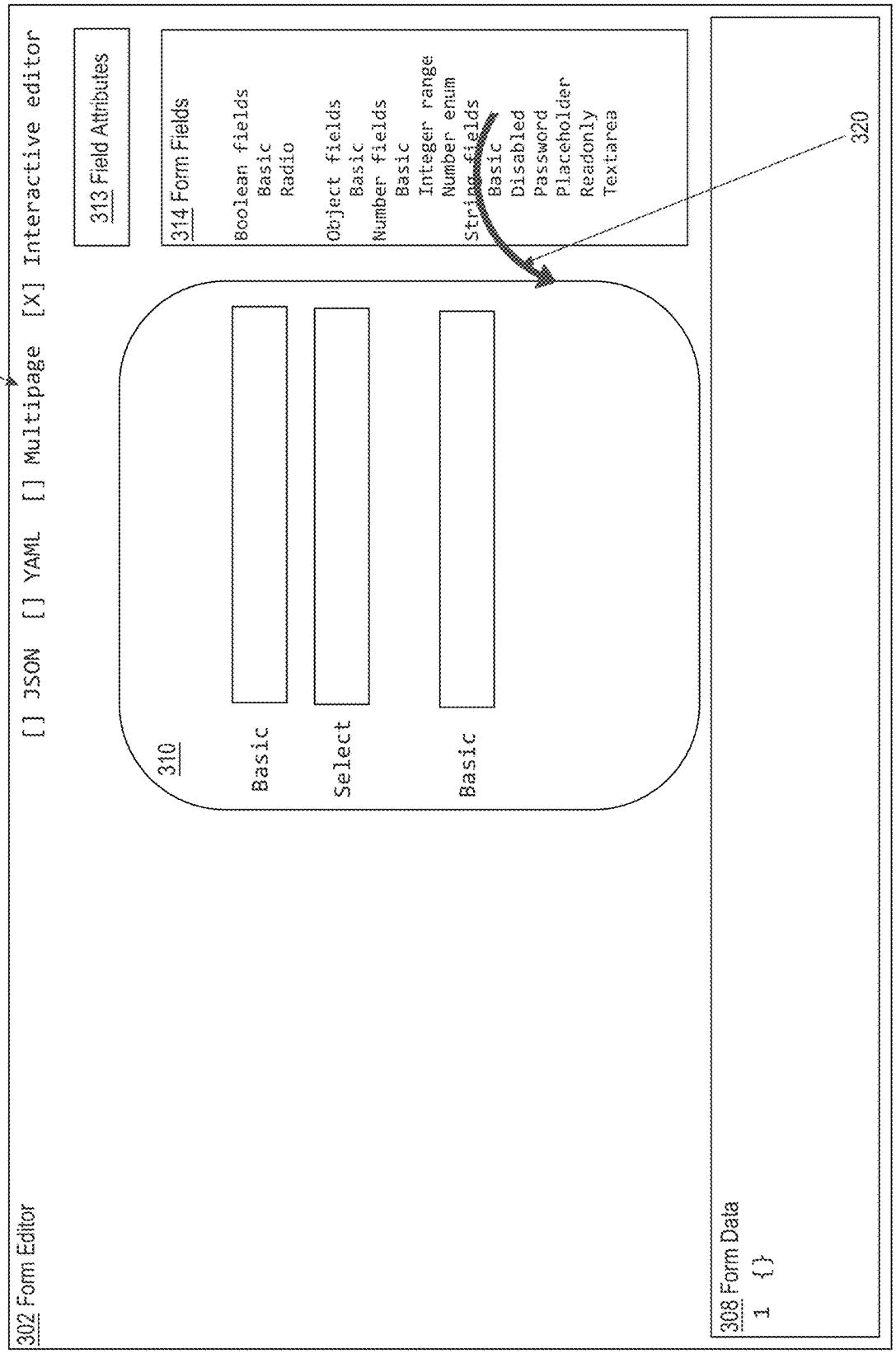
FIG. 3B shows an example computer display device like FIG. 3A in which an expanded form fields panel is displayed with an association to a form.

FIG. 3A illustrates an example computer display device that has rendered and displayed a graphical user interface, shown in schematic form, providing a form editor with the concurrent display of a form visualization, data schema, user interface (UI) schema, form data, field attributes, and form fields. FIG. 3B shows an example computer display device like FIG. 3A in which an expanded form fields panel is displayed with an association to a form. Referring first to FIG. 3A, in an embodiment, a computer display device 300 comprises a graphical user interface termed a form editor 302 comprising a data schema window 304, a UI schema window 306, a form data window 308, a form 310, a field attributes panel 313, a template panel 314, and controls 312. In one embodiment, form 310 comprises a graphical visualization of a data entry form that can be used, for example, in connection with a SaaS-based database application. In some embodiments, as described in other sections, separate data schema and UI schema windows 304, 306 are not required, as definitions of UI or presentation elements can be unified in the data schema.

FIG. 3A, and other views of the drawing figures, are shown and described with reference to a computer display device 300. In various embodiments, the computer display device 300 can be integrated with or peripheral to any of the user computers 102, 104. Examples of computer display devices that can work with embodiments include LCD displays, touchscreen displays, smartphone displays, plasma display panels, vector displays, CRT screens, and any other digital electronic device by which a graphical user interface can be rendered or displayed. The graphical user interfaces of this disclosure can be rendered using graphical processing units, conventional CPUs, or other processors, alone or in combination with display drivers or other electronics. Presentation instructions 126 can be programmed on the server side to generate and output display instructions that an application program or browser at one of the user computers 102, 104 can parse and render, independently or by calling or interoperating with graphics primitives, system display services, or operating system APIs that support graphical displays. Display instructions can comprise dynamic HTML, streams of API calls with parameter values, vector display instructions, and so forth.

Form 310 can comprise a plurality of different data entry fields of which one field titled "Basic" is shown in FIG. 3A for purposes of illustrating a clear example. In other embodiments, form 310 can have multiple pages or steps, and each page or step can have any practical number of fields. In an embodiment, the template panel 314 identifies available field types by category and subtype; an example of a category is "Number fields" and an example of a subtype is "Number enum" meaning an enumerated numeric field.

Adding a field to form 310 comprises receiving input specifying dragging a template identifier from the template panel 314 and dropping the template identifier on form 310. Referring now to FIG. 3B, in one embodiment, other fields titles SELECT and BASIC can be added to form 310 by dragging a template identifier into form 310, as indicated by arrow 320. Drag and drop operations can be signaled using a computer pointing device such as a mouse, trackball, or touchpad, or directly on a touch-sensitive screen of the device 300.

In response, the form editor 302 is programmed to automatically display a default name of the new field in form 310 and a graphical widget in which data entry can be accepted. In the example of FIG. 3A, the "Basic" field is a number field and has a rectangular widget that is programmed to accept numeric data entry. Also in response to the drag and drop operation, the form editor 302 is programmed to immediately generate code for a data schema corresponding to the form 310 with the new field, to update the data schema window 304 to show the code, to generate code for a UI schema corresponding to the form with the new field, and to update the UI schema window 306 to show the code. The data schema window 304 provides a coded representation of what data fields are in form 310, and the UI schema window 306 provides a coded representation of how those fields should be displayed in the form.

The data schema code and UI schema code are digitally stored in main memory in data structures or files that serve as backing stores for the data schema window 304 and UI schema window 306. In some embodiments, one or more of the data schema window 304, UI schema window 306, and form data window 308 can be hidden from the display of the form editor, for example, in response to user input selecting one or more window closing controls that are associated with the windows. Thus, the data schema window 304 and UI schema window 306 represent visualizations of the underlying backing stores but a continuous visual display of those windows is not required in all embodiments. What is important is that the relevant code is generated and updated in storage in real-time without user involvement so that user action can be limited to dragging and dropping fields into the form.

Furthermore, the form editor 302 is programmed to execute converse updates of form 310 and its visual appearance in response to user input specifying an edit or a change to the code shown in the data schema window 304 or UI schema window 306. In an embodiment, each of the data schema window 304 and the UI schema window 306 is programmed as a text editor capable of receiving user input specifying a selection of a character position within code shown in either window, typed changes, selections, copy and paste operations, cut or delete operations, and other text editing operations that have been implemented in character-based text editors in graphical user interfaces. In an embodiment, the form editor 302 is programmed to execute converse updates of form 310 and its visual appearance character-by-character, in real-time, in response to user input specifying a change to the code shown in the data schema window 304 or UI schema window 306. Or, updates to form 310 can occur after multiple edits to the windows in response to detecting a change in focus of the cursor outside the windows to the form or other elements of the form editor 302 interface.

The form data window 308 provides a visualization of a coded version of data values that are entered in form 310. When the form editor 302 is used to create form 310, form data window 308 effectively provides a preview of the coded version of data values that will be created and eventually posted to a back-end application server when the form is in use at runtime after installation with an instance of the SaaS application (FIG. 1). For example, with the form editor 302 of FIG. 3A, once a field has been added to form 310, the user who is creating the form can type data values into the field of the form. In response, the form editor 302 is programmed to generate a coded version of the data values and display the coded version in form data window 308. The coded version can conform to JSON, YAML, or another structured language or format. In an embodiment, the coded version of the data values in data window 308 represents the format of data that form 310 will transmit in a POST request or other transmission at runtime to move data from the form to another server.

Template panel 314 can comprise any number of templates for a plurality of different categories of data fields, each having multiple subtypes. The templates can correspond to available field types in the JSON data schema. The items in template panel 314 are not exhaustive and other data types can be supported in other embodiments. In one embodiment, the categories and subtypes comprise Boolean fields: Basic, Radio, Select; Object fields: Basic; Number fields: Basic, Integer range, Number enumerated (enum); String fields: Basic, Disabled, Password, Readonly, Textarea. References to "object," in this context, refer to a programmatic construct to define a logical container of one or more primitives or child elements. Embodiments allow any number of nesting levels of objects and containment. A field of type String based on the Disabled template can be used to present a default value in a form that the user cannot change. When a field is based on the Disabled template, and has a default value, the default value is automatically reflected in the Form Data when the field is added to the form. Or, a Disabled template can be used to identify a hidden data field.

Other Field Attributes could allow marking a field as a secret field, to signal that later processing of such values must occur with added security. Examples of added security include requiring checking user access controls before transferring values of the field to a different user or requiring checking application access controls before transferring values of the field to another system, process, workflow, application, computer, or network domain. By defining such controls in field attributes, the data schema can be updated automatically when a field having those attributes is added to the form.

Controls 312 specify a plurality of functions to enable user input to signal changes in how the form editor 302 operates. In one embodiment, controls 312 include toggle widgets by which the user can specify displaying code using JSON or YAML, without an interactive editor display like form editor 302. In an embodiment, selecting the JSON control or YAML control causes the visual display of form 310, field attributes 313, form fields 314, and form data 308 to close, opening editors for the code of the data schema window 304, using JSON syntax or YAML syntax, respectively. In contrast, when an "Interactive Editor" control is selected among the controls 312, in response, the form editor 302 of FIG. 3A, FIG. 3B is displayed. Controls 312 also can include an EXPORT CODE widget, which can be programmed as an active link or graphical button. In an embodiment, in response to user input specifying a selection of the EXPORT CODE widget, the form editor 302 is programmed to invoke a file download function of the operating system of the user computer 102 of the then-current user and to cause transmitting a copy of the data schema code that is shown in data schema window 304. The EXPORT CODE function enables a user to obtain a copy of the automatically generated code to include in a package for later upload to a shared filesystem. Normally the EXPORT CODE operation is used when the user considers the form 310 complete and ready for sharing with others as part of a package in the shared filesystem.

Each data field in form 310 has a plurality of digitally stored attributes such as an internal field name, a screen name or display name of the field, and one or more properties or constraints. In the embodiments of FIG. 3A, FIG. 3B, dragging and dropping a field template from the template panel 314 to the form 310 causes automatically instantiating a field definition in the code of the data schema window 304, including automatically copying the default attributes of the field template into the code. Thereafter, one or more attributes of any field of form 310 can be modified by identifying or selecting the field, then accessing the field attributes panel 313. Identifying a field can comprise using a pointing device of the user computer 102 to cause hovering a screen cursor over a particular field of form 310. Selecting a field can comprise using a pointing device of the user computer 102 to cause hovering a screen cursor over a particular field of form 310.

A comparison of FIG. 3A to FIG. 3B will show that FIG. 3B represents an example in which a "Select" field and a second "Basic" field have been dragged into and instantiated in the form 310. In response to those operations, form editor 302 is programmed to automatically update the data schema window 304 to display the data schema code of TABLE 1, and to automatically update the UI schema window 306 to display the UI schema code of TABLE 2:

TABLE 1

| Updated Data Schema Code for FIG. 3B |
| --- |
| 1    { |
| 2      "type": "object", |
| 3      "properties": { |
| 4        "number": { |
| 5          "title" "Basic", |
| 6          "type": "number" |
| 7        }, |
| 8        "boolean": { |
| 9          "title" "Select", |
| 10         "type": "number" |
| 11       }, |
| 12        "number": { |

TABLE 1-continued

Updated Data Schema Code for FIG. 3B

| | |
|---|---|
| 13 | "title" "Basic", |
| 14 | "type": "number" |
| 15 | }, |
| 16 | } |

TABLE 2

Updated UI Schema Code for FIG. 3B

| | |
|---|---|
| 1 | { |
| 2 | "number": { }, |
| 3 | "Boolean: { |
| 4 | "us:widget": "select" |
| 5 | }, |
| 6 | "string": { }, |
| 7 | } |

Figure 4B:
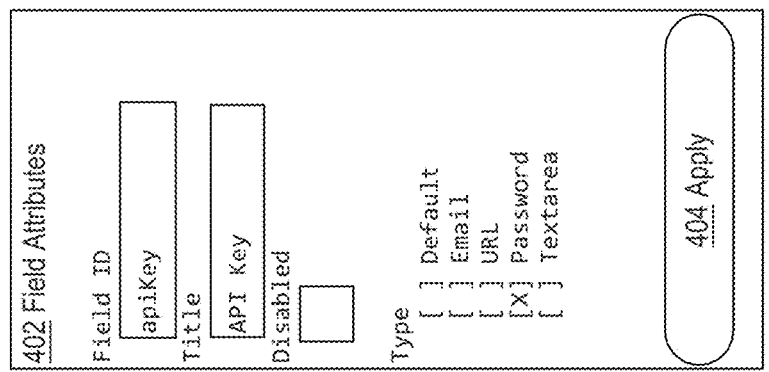
FIG. 4B illustrates a schematic view of an example attributes panel.
Figure 4A:
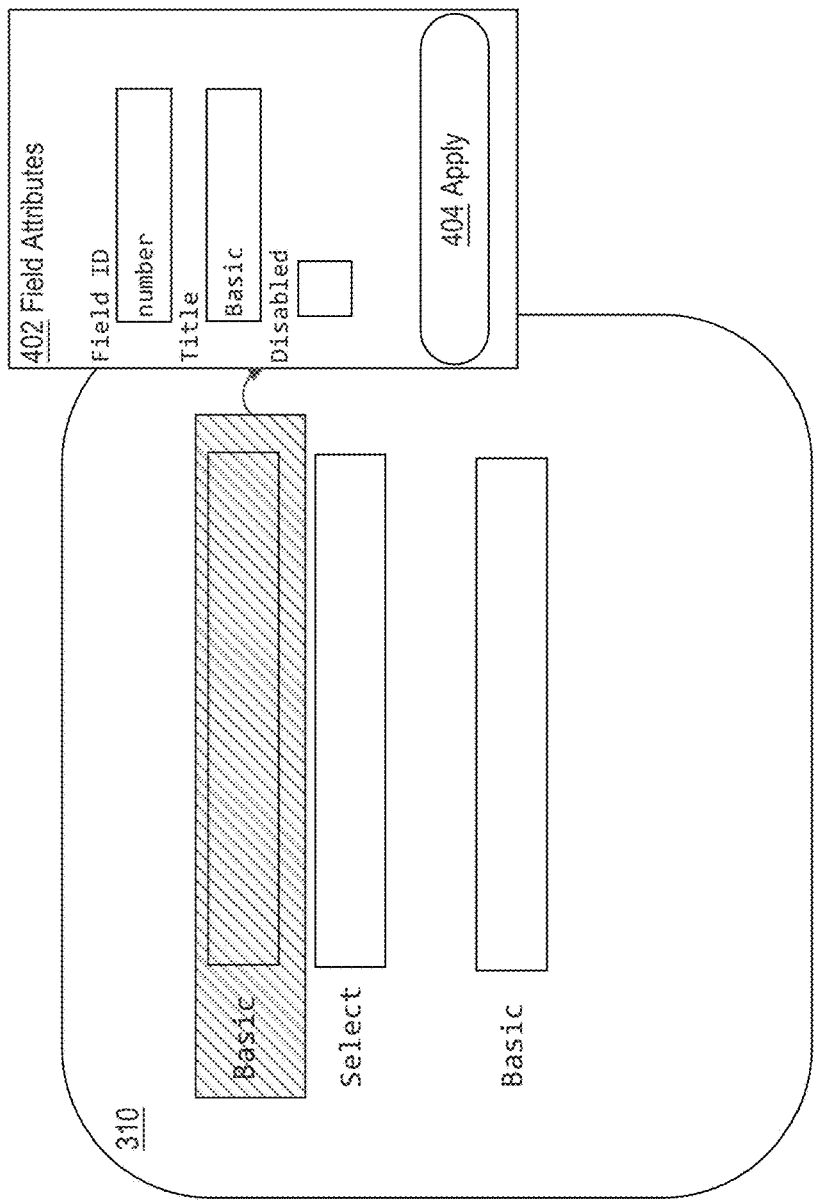
FIG. 4A illustrates a form like that of FIG. 3A in which one field is highlighted resulting in the display of a pop-up field attributes panel.

FIG. 4A illustrates a form like that of FIG. 3A in which one field is highlighted resulting in the display of a pop-up field attributes panel. In the example of FIG. 4A, user input has signaled a selection of the first field titled BASIC. In response, the form editor 302 is programmed to cause updating the field using a distinct visual attribute, such as highlighting, reverse color, distinct color, or another attribute. Concurrently, the form editor 302 is programmed to automatically display a pop-up field attributes panel 402 near the selected field and to populate the field attributes panel with field attributes and values for the attributes that correspond to the selected field. Thus, the size and contents of the field attribute panel 402 will vary depending upon which field was selected, its name, type, and other values. In the example of FIG. 4A, the Basic field has an internal ID of "number," a title or display name of "Basic," and a "Disabled" attribute that is not selected. Each of the attributes shown in the field attributes panel 402 is programmed to accept user input to change values such as "number," "Basic," or a checkbox in the "Disabled" attribute. In response to user input to update any values in the field attributes panel 402, followed by a selection of an Apply widget 404 or a similar activation widget, the form editor 302 is programmed to automatically concurrently update the visual appearance of the field in form 310, the code in the data schema window 304, and the code in the UI schema 306. Thus, each field can have a plurality of attributes. In one embodiment, a field can have a REQUIRED attribute which, if selected or enabled at runtime after the form is installed, causes the application instances 106A, 106B to enforce a data entry requirement for that field. Field attributes also can be manually entered using JSON code in the data schema window 304.

FIG. 4B illustrates a schematic view of an example attributes panel. The example of FIG. 4B shows attributes of a numeric field from a template for an API key type having an internal ID of "apiKey," a display name of "API Key," the Disabled attribute not selected, and a Type of "Password". In an embodiment, the form editor 302 is programmed, in processing a field having the "Password" type, to hide data entered in the field using characters such as "*" or other techniques for obfuscating password data. The example of FIG. 4B shows that the appearance of the attributes panel 402 will vary based on the type of field that is identified or selected.

Figure 5:
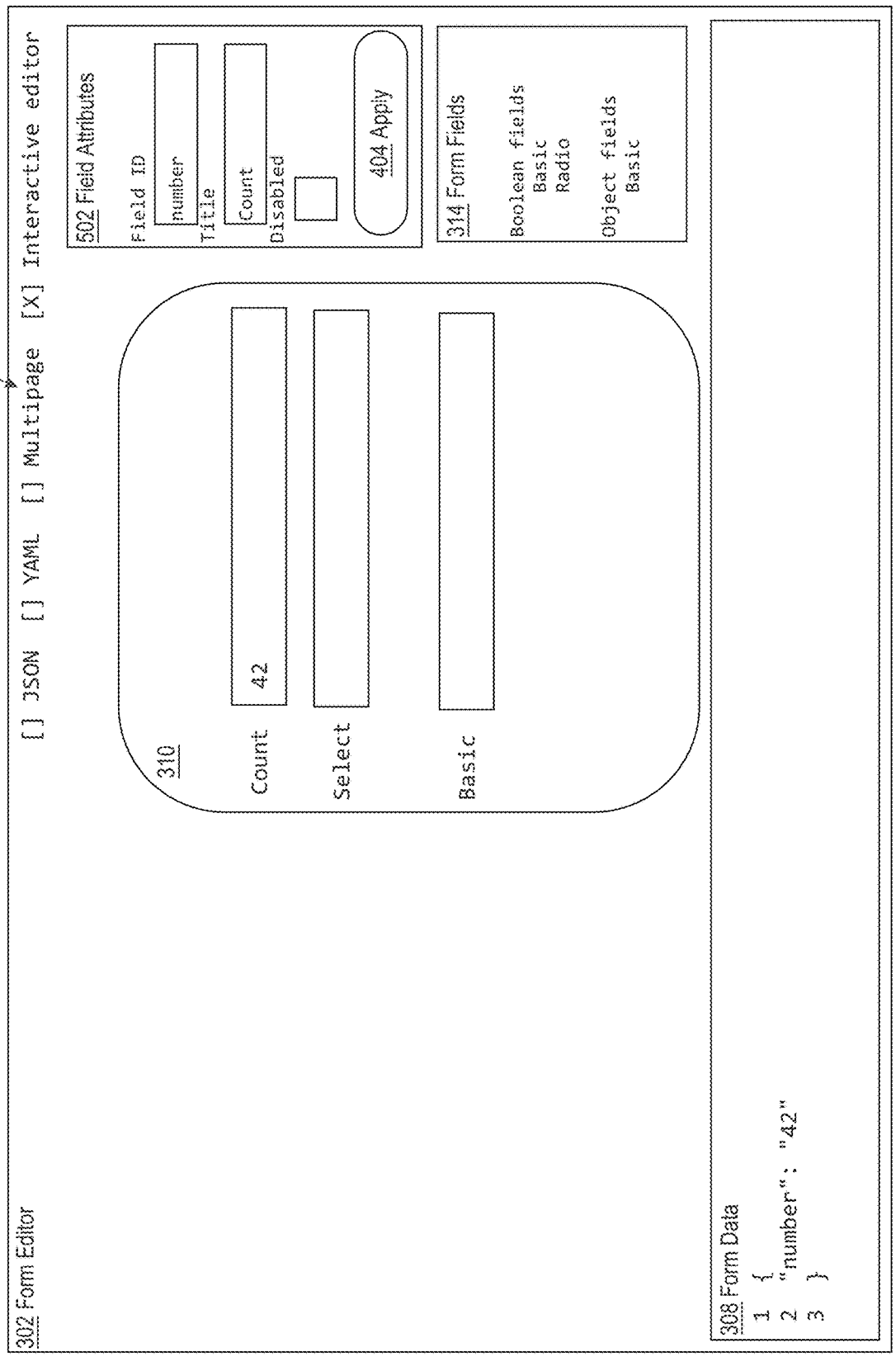
FIG. 5 illustrates an example computer display device like FIG. 3A in which a numeric value is entered in one field of the form, form data with that value is displayed, and both a field attributes panel and form fields panel are displayed.

FIG. 5 illustrates an example computer display device like FIG. 3A in which a numeric value is entered in one field of the form, form data with that value is displayed, and both a field attributes panel and form fields panel are displayed. FIG. 5 represents an example in which an end-user has used form editor 302 to add fields to a form, then selected the Count field, resulting in field attributes panel 502 opening and displaying values of attributes that correspond to the Count field. Further, the end-user has entered "42" in the Count field and, in response, form editor 302 is programmed to update the form data window 308 automatically with code specifying the value "42" in association with the "Field ID" of "number" shown in field attributes panel 502. If the form had been in use at runtime with one of the application server instances 106A, 106B, and the end user had entered "42" at that time, the application server instance would have used the code shown in the form data window 308 in a payload of a POST request, or a similar call, to an application server to provide the value. Thus, the example of FIG. 5 shows that an end user can use form editor 302 to validate that the coding of the form data in form data window 308 is correct based on values entered in form 310. Asynchronously, the end user also can modify one or more attributes of the "Count" field by updating values of the field attributes panel 502.

Figure 6:
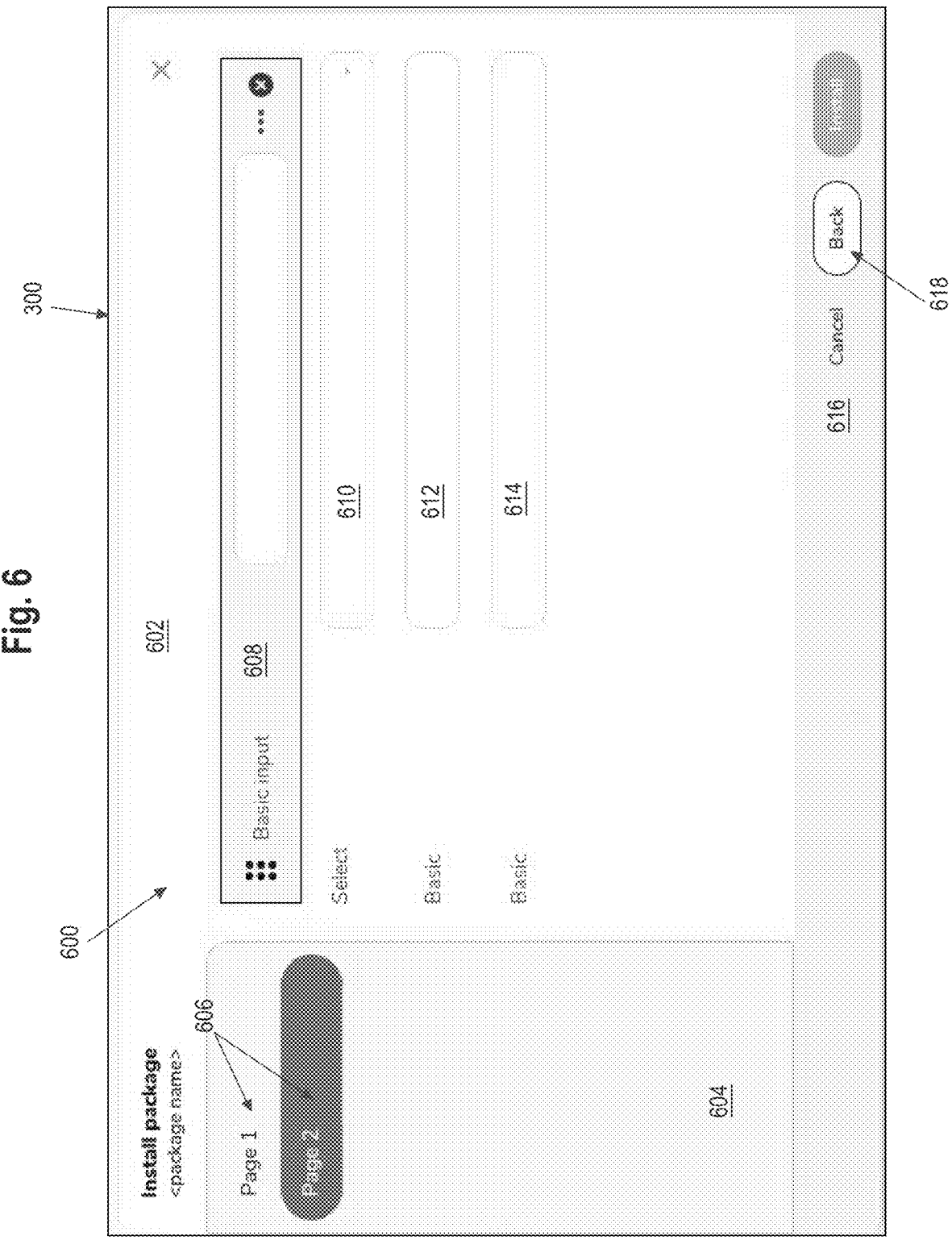
FIG. 6 illustrates an example computer display device that has rendered and displayed a graphical user interface for a multipage form in which one field is highlighted.

FIG. 6 illustrates an example computer display device that has rendered and displayed a graphical user interface for a multipage form in which one field is highlighted. In the example of FIG. 6, a computer display device 300 has rendered a graphical user interface of a form editor 600 in which form 602 has been created. A page control panel 304 comprises page selection widgets 606, which are programmed using toggle techniques to receive input specifying a first page or a second page and, in response, to cause updating form 602 to show fields for the selected page. In the example of FIG. 6, "Page 2" is selected so the form 602 shows fields for that page.

The second page comprises a "Basic input" field 608, which is shown in a selected state, and a "Select" field 610 and "Basic" fields 612, 614, which are in non-selected states. A control bar 616 can comprise a BACK widget and NEXT widget, implemented as an active graphical button, which can be programmed to toggle between BACK and NEXT states to control virtual movement between Page 1 and Page 2 of a multipage form. In an embodiment, a multipage form can have any number of pages. Multiple-page forms may be useful when a package needs to collect complex, structured, or extensive data from the user. For example, multiple pages can contain ordered sets of data that are reached using the NEXT or BACK widgets. Further, in a subsequent page, a particular data entry element such as a drop-down menu can be programmed to provide selections that are data based on a value that was entered in a previous page. The selection of the NEXT button can be programmed to cause submitting the data values of a previous page for storage in the data repository 116 (FIG. 1) so they can be recalled in a database query call when the next page is accessed.

As with prior examples, when form 602 of FIG. 6 is edited to create multiple pages and add fields, the form editor is programmed to update the data schema window 304 automatically with code corresponding to the pages and fields of the form. TABLE 3 illustrates an example of data schema code that would be generated, in one embodiment, for the example of FIG. 6, stored in the data schema backing store, and optionally displayed in the data schema window 304.

TABLE 3

Updated Data Schema Code for FIG. 6

```
1    # Set this fixed keywords at the top:
2    spec: "schema.yml:1.0"
3
4    # Declare names of the configuration variables that must
be kept secret.
S    # These variables are handled specially to ensure
security.
6    # secret:
7    # - key
8
9    # Declare total number of pages
10   total_pages: 2
11
12   a Declare configuration variables using JSON schema
13   # per http://json-schema.org/understanding-) son-schema/
14
15   # JSON schema for page 1
16   page1:
17   Sschema: http://json-schema.org/draft-07/schema
18   type: object
19   properties:
20   apiKey:
21   type: string
22   title: API Key
23   booleanl: &ref_O
24   title: Basic
25   type: boolean
26   boolean: *ref_O
27   ui:
28   apiKey:
29   ui:widget: password
30   booleanl: { }
31   boolean:
32
33
34   # JSON schema for page 2
35   page2:
36   type: object
37   properties:
38   number:
39   title: Basic input
40   type: number
41   boolean:
42   title: Select
43   type: boolean
44   string:
45   title: Basic
46   type: string
47   numberl:
48   title: Basic
49   type: number
50   ui:
51   number:
52   boolean:
53   ui:widget: select
54   string:
55   numberl: { }
56
```

In the example of TABLE 3, the JSON schema code for both "page1" and "page2" includes "ui:" declarations. In embodiments, the data schema code supports either JSON or YAML as a source language for the code but also includes a derivative schema that unifies the UI schema into the data schema code. In one implementation, a "ui" field in the top level of the data schema facilitates easier transport of a payload from an API to front-end rendering elements, such as presentation instructions 126, which can then divide the code to complete rendering a form in the front-end at runtime. Thus, embodiments can interoperate with a split JSON schema and UI schema, or use a custom unified schema that supports multiple-page forms.

Figure 7:
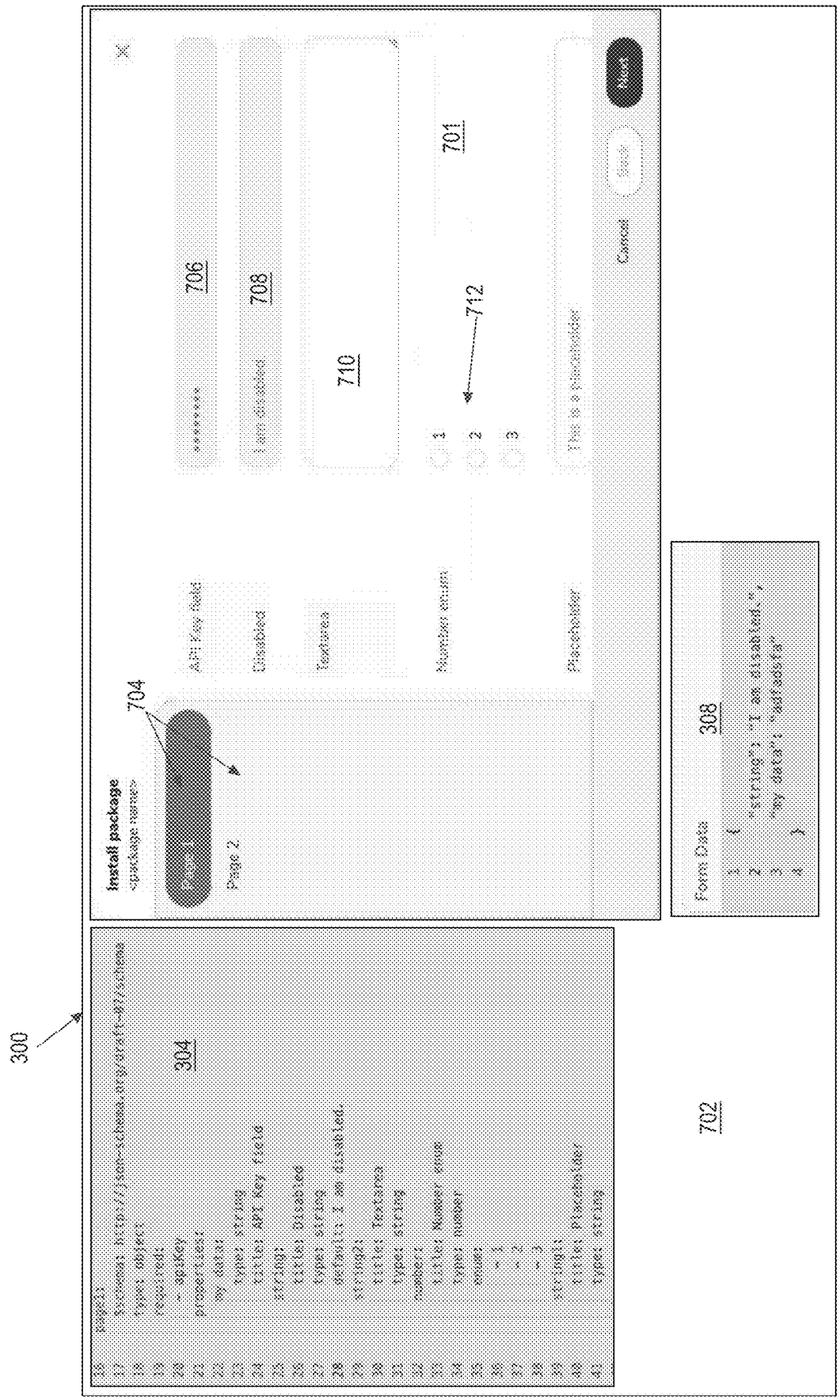
FIG. 7 illustrates an example computer display device like FIG. 6 in which a data schema window and form data window have been displayed in association with a form.

FIG. 7 illustrates an example computer display device like FIG. 6 in which a data schema window and form data window have been displayed in association with a form. In the example of FIG. 7, a computer display device 300 has rendered and displayed a user interface for a form editor 702 with a form 701 having two pages as indicated by page selection widgets 704, of which "Page 1" is selected. The first page comprises an API key field 706, a disabled or hidden field 708, a textarea field 710, an enumerated numeric field 712, and a placeholder text entry field. The API key field 706 is an example of a Secret field and form editor 702 can be programmed to interpret the attributes of such a field to require displaying obfuscated characters of a field value rather than actual characters of a field value. The textarea field 710, which can be instantiated from a template of category "String" and subtype "textarea," can be programmed to accept multiple lines of text input. The form editor 702 can be programmed to process the "Number enum" field, which can be instantiated from a template of category "Number" and subtype "enum," to cause displaying an enumerated list of radio button widgets, each associated with a different numeric value.

Furthermore, in the example of FIG. 7, the form editor 702 comprises a data schema window 304 and a form data window 308, as in prior examples. The data schema window 304 is updated automatically to show code for a data schema that corresponds to the multipage form and its fields. The form data window 308 has been updated automatically to reflect the values entered in the API key field, which has the internal identifier of "my data" in this example, and in the Disabled field, which has the internal identifier of "string." Note that in this example, the value entered in the API key field 706 is shown in the form data window 308 in plaintext form. In other embodiments, the form editor 702 could be programmed to generate the form data for a secure or obfuscated field using encryption or other encoding techniques and place the ciphertext or coded version in the form data of the form data window.

Figure 8A:
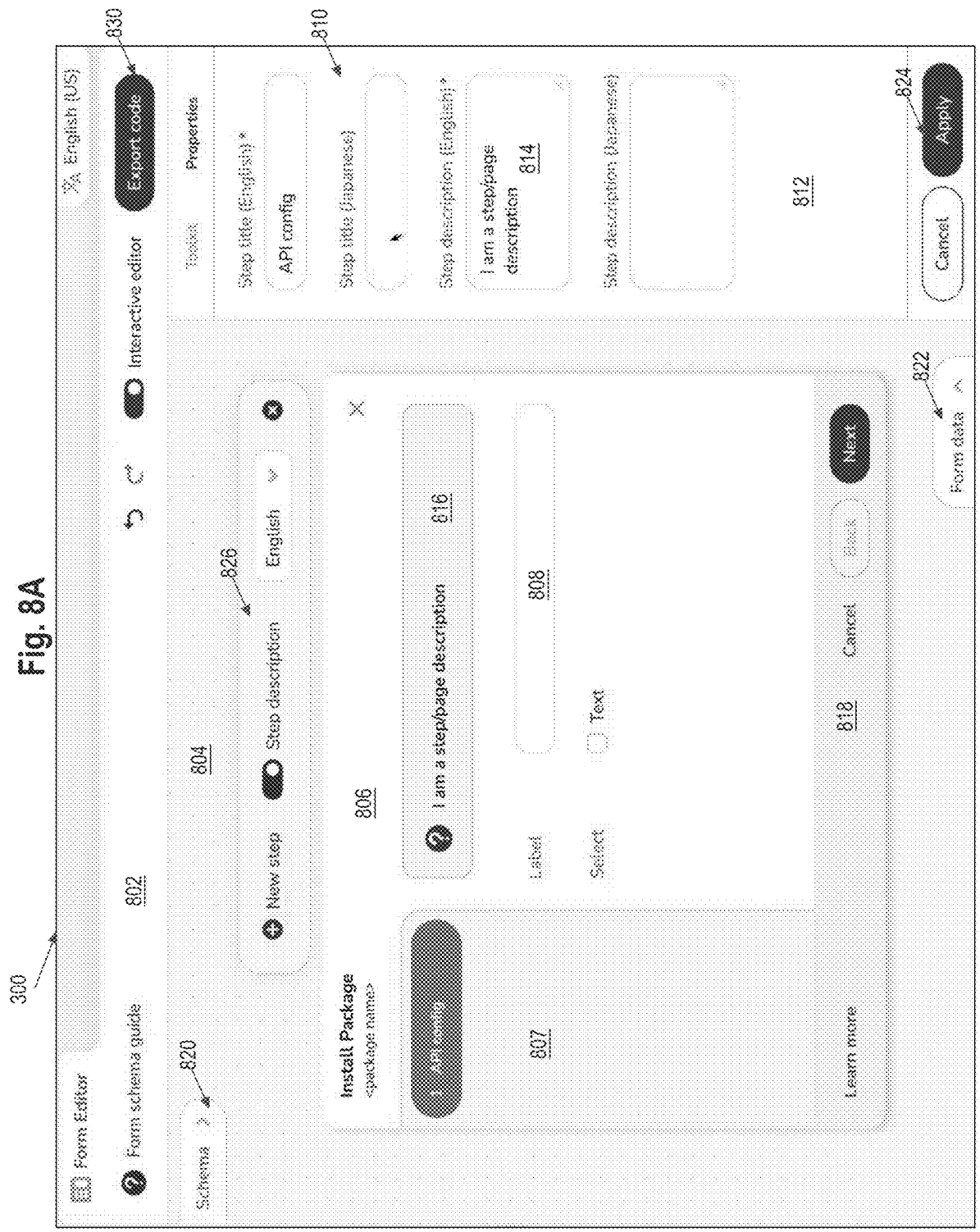
FIG. 8A illustrates an example computer display device like FIG. 6 in which a multipage form is undergoing creation and a step properties panel is displayed.
Figure 8B:
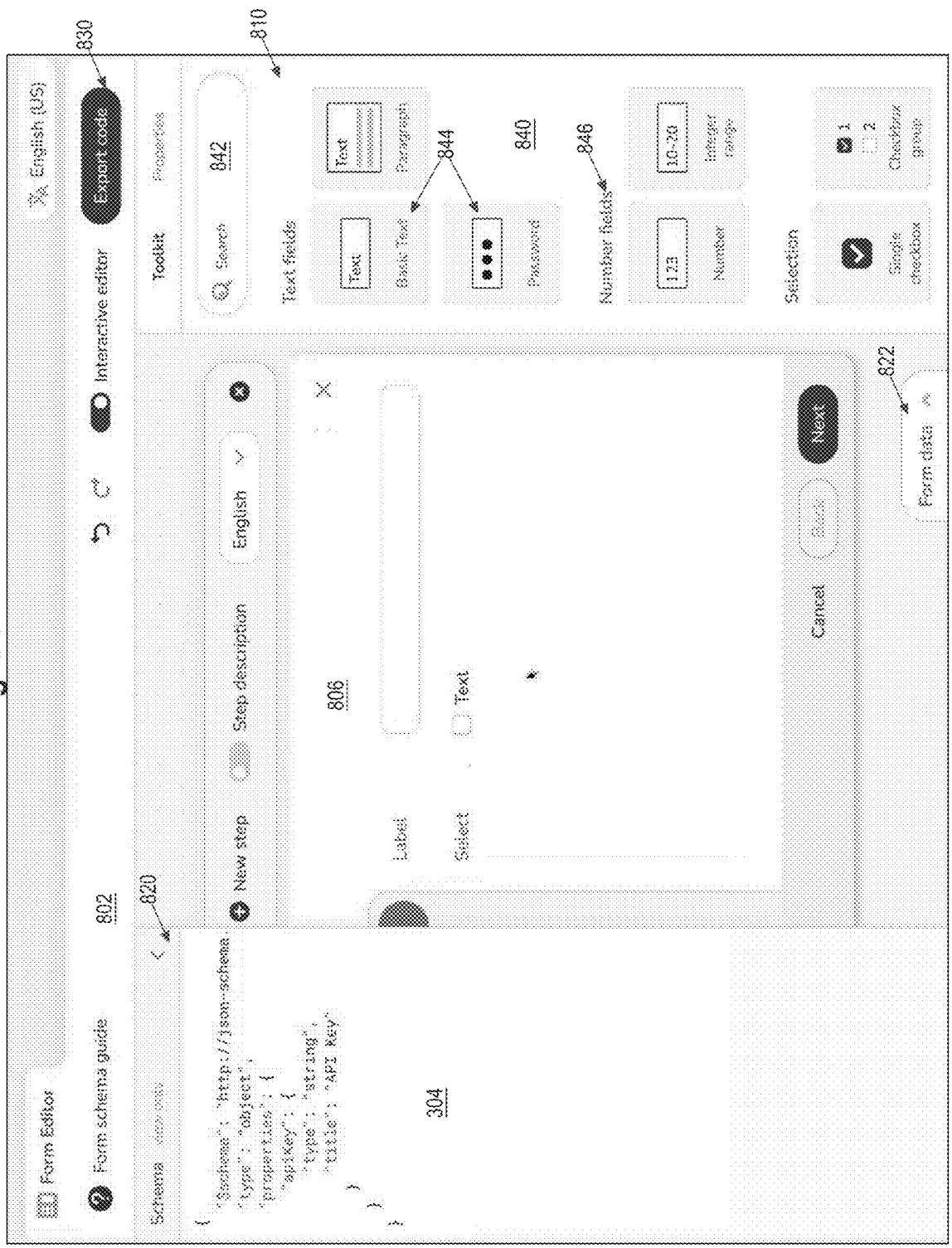
FIG. 8B illustrates an example computer display device like FIG. 8A in which a data schema window and field toolkit are displayed.

FIG. 8A illustrates an example computer display device like FIG. 6 in which a multipage form is undergoing creation and a step properties panel is displayed. FIG. 8B illustrates an example computer display device like FIG. 8A in which a data schema window of 35 and field toolkit are displayed. Referring first to FIG. 8A, in one embodiment, a computer display device 300 has rendered and caused displaying a graphical user interface of a form editor 802, comprising a form workspace 804, a form 806, a control window 810, a data schema control 820, a form data control 822, a step control panel 826, and a code export control 830. In an embodiment, the form workspace 804 serves as a visual container for form 806, a data schema control 820, form data control 822, and step control panel 826. As with prior examples, form 806 can comprise a plurality of form pages or steps specified by step controls 807, although the example of FIG. 8A includes a single step titled "API config". The terms "page" and "step" are used interchangeably and either term or different functionally equivalent terms can be used in various embodiments. Form 806 in this example comprises a "Label" field 808 that accepts text entry, and a "Select" field with a single enumerated radio button. A set of form controls 818 can comprise graphical widgets that are programmed to toggle between steps of a multiple-step form 806, such as BACK and NEXT widgets.

Each form 806 also can include a step description 816. The presence or absence of a step description can be specified using a toggle widget in the step control panel 826 which, in this example, is set to ON or the equivalent. In some embodiments, the step control panel 826 can include a language widget that is programmed to accept user input to specify a display language for the form 806 and to invoke, automatically, translation logic to translate the text of form fields and labels to a target language specified using the language widget. In some embodiments, the form editor can be programmed with localization support in the UI schema definition to dynamically render a form in different languages depending upon a local language preference of the user computer 102, 104. This allows customization of various field descriptors such as title, description, help text, hint text, and option labels. At runtime, the presentation instructions 126 can be programmed to use the locale of the user computer 102, 104, or a locale of an application hosted in one of the application server instances 106A, 106B, to select and show the appropriate descriptor string. TABLE 4 shows an example of a unified data schema that declares form title values using multiple alternative languages.

TABLE 4

Unified schema declaring multiple languages

```
{
    {
        "type": "object",
        "properties": {
            "input": {
                "type": "boolean",
                "title": "Input title"
            }
        },
        "ui": {
            "input": {
                "ui:widget": "radio",
                "ui:title": "Default title",
                "ui:en:title": "English title",
                "ui:ja:title": "Japanese title",
            }
        }
    }
}
```

In an embodiment, the content of step description 816 is specified by selecting the control window 810, which is programmed to provide two or more tabs 812 titled Toolkit and Properties in the example of FIG. 8A. In an embodiment, the form editor 802 is programmed, in response to user input selecting a tab label, like Toolkit or Properties, to update the control window 810 with one or more data input fields that are associated with the specified tab. For the Properties tab, data input fields can comprise a step title and a step description, each of which can be specified in one or more languages. Changes to the data input fields can be activated by user input to select an APPLY widget 824 in the control window 810. The form editor is programmed, in response to a selection of the APPLY widget 824, to update the form 806 with changes in values that were entered in the control window 810. Thus, in an embodiment, the step description 816 updates automatically when the step description field 814 changes in the control window 810.

In an embodiment, the form editor 802 is programmed, in response to user input selecting the data schema control 820, to visually expand the data schema control to show a data schema window with a listing of data schema code corresponding to the form 806, in a manner similar to data schema window 304 of FIG. 7. The data schema control 820 can be programmed with toggle functionality to selectively cause the data schema window 304 to expand or collapse in response to successive selections of the control.

Similarly, the form editor 802 is programmed, in response to user input selecting the form data control 822, to visually expand the form data control to show a form data window with values that have been entered in the form similar to form data window 308 of FIG. 7. The form data control 822 can be programmed with toggle functionality to selectively cause the form data window 308 to expand or collapse in response to successive selections of the control.

In an embodiment, an EXPORT CODE widget 830 is programmed to cause exporting the code of the data schema window 304 to a file on the user computer 102, 104, as previously described for other examples.

Referring now to FIG. 8B, illustrates an example computer display device like FIG. 8A in which a data schema window and field toolkit are displayed. Data schema control 820 has been selected, and in response, the form editor 802 is programmed to automatically instantiate and display a data schema window 304 with a listing of data schema code corresponding to form 806, after calling the schema validator 110 to generate the code. Whenever the data schema window 304 is open, form editor 802 is programmed to update the code listing automatically in response to user input to drag and drop fields into the form or change the attributes of the fields. In the example, the Toolkit tab 812 of the control window 810 has been selected, and the form editor 802 is programmed, in response to cause updating the control window to display a search box 842 and a plurality of field template tiles 844, each corresponding to a different subtype of field that can be added to the form 806. Any number of different field template tiles 844 can be provided and the control window 810 can be implemented using scrolling techniques to enable user input to scroll the tiles upward or downward to hide or reveal tiles. Field template tiles 844 can be organized in categories under or near category labels 846 of which "Text fields," "Number fields," and "Selection" are shown, as examples. Each of the field template tiles 844 can comprise a graphical polygon that specifies a field identifier, such as "integer range," and an icon or other graphical visual representation of the appearance of a corresponding field when the field template tile is instantiated into a field in form 806. As with the templates of form fields windows 314 in the examples of FIG. 3A, FIG. 3B, each field template tile 844 can be selected, via user input using a pointing device, and dragged into form 806; in response, the form editor 802 is programmed to instantiate a field corresponding to the selected field template tile and add the field to the form.

Using the disclosed embodiments, a computer user can cause concurrent updates to a data schema and a user interface schema while visually creating a form by dragging and dropping data fields into the form, thereby associating fields of different types and having different attributes with the form, and while automatically generating a preview representation of the data that an end user would enter into the form at runtime. The concurrent creation of four kinds of data—the data schema, the user interface schema, an association of data field types with a form, and a representation of entered data—represents a departure from past practice and one aspect of the inventive contribution that the inventor conceived in an inventive moment, as does the combination of views of these four classes of data in a single user interface.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
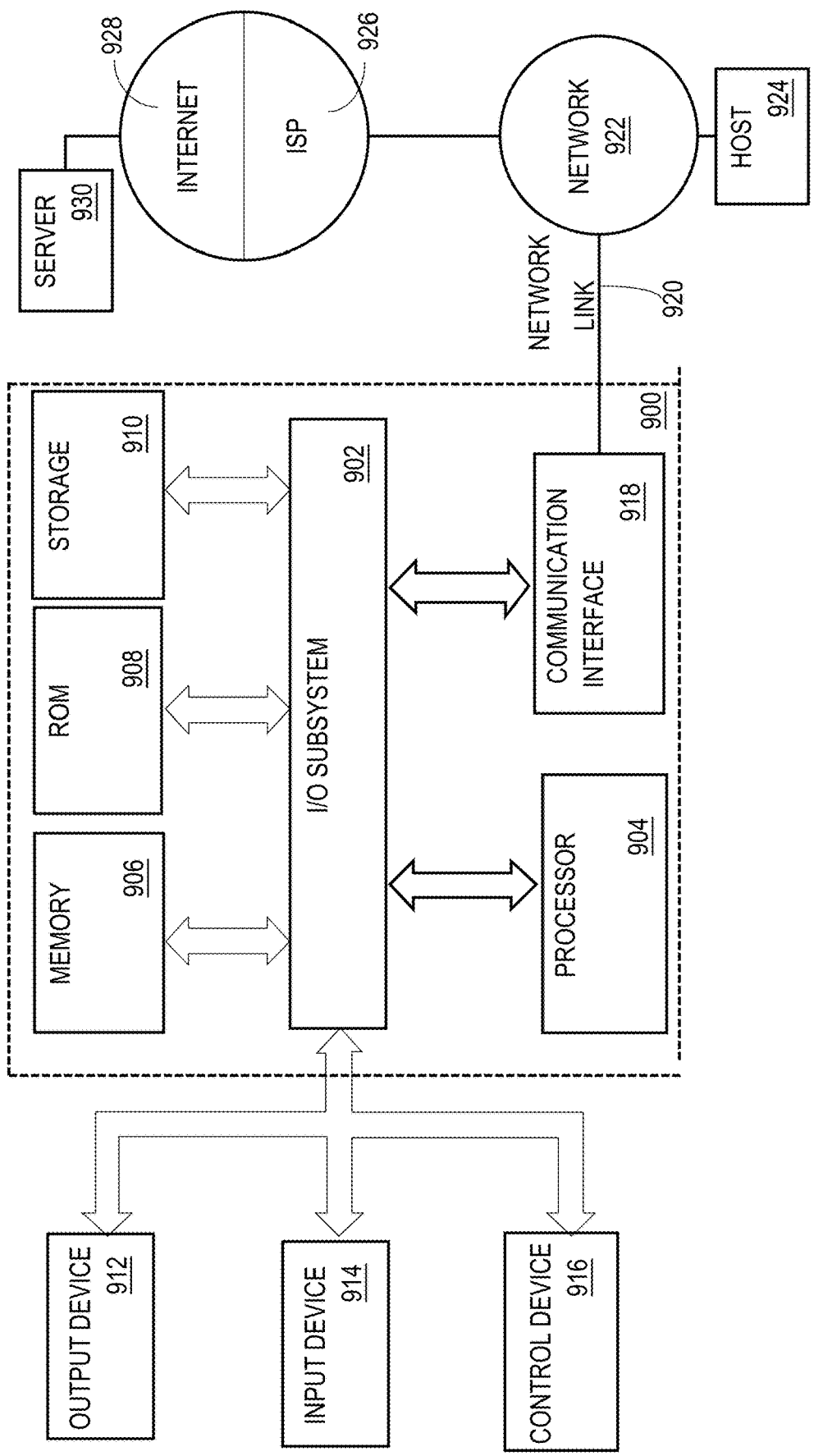
FIG. 9 illustrates a computer system with which one embodiment could be implemented.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 900 includes an input/output (I/O) subsystem 902 which may include a bus and/or other communication mechanism(s) for communicating information and/or instructions between the components of the computer system 900 over electronic signal paths. The I/O subsystem 902 may include an I/O controller, a memory controller, and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system or a graphics processing unit (GPU), or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or other dynamic storage device. Memory 906 also may be used for storing temporary variables or other intermediate information during the execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read-only memory (ROM) 908 or other static storage devices coupled to I/O subsystem 902 for storing information and instructions for processor 904. The ROM 908 may include various forms of programmable ROM (PROM) such as erasable PROM (EPROM) or electrically erasable PROM (EEPROM). A unit of persistent storage 910 may include various forms of non-volatile RAM (NVRAM), such as FLASH memory, solid-state storage, magnetic disk or optical disks such as CD-ROM or DVD-ROM and may be coupled to I/O subsystem 902 for storing information and instructions. Storage 910 is an example of a non-transitory computer-readable medium that may be used to store instructions and data which when executed by the processor 904 cause performing computer-implemented methods to execute the techniques herein.

The instructions in memory 906, ROM 908, or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using structured query language (SQL) or no SQL, an object store, a graph database, a flat file system, or other data storage.

Computer system 900 may be coupled via I/O subsystem 902 to at least one output device 912. In one embodiment, output device 912 is a digital computer display. Examples of a display that may be used in various embodiments include a touchscreen display or a light-emitting diode (LED) display or a liquid crystal display (LCD) or an e-paper display. Computer system 900 may include other types of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators or servos.

At least one input device 914 is coupled to I/O subsystem 902 for communicating signals, data, command selections, or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. Control device 916 may be a touchpad, a mouse, a trackball, or cursor direction keys for communicating direction information and command selections to processor 904 and for controlling cursor movement on display 912. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other type of control device. An input device 914 may include a combination of multiple different input devices, such as a video camera and a depth sensor.

In another embodiment, computer system 900 may comprise an Internet of Things (IoT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders, and the output device 912 may comprise a special-purpose display such as a single-line LED or LCD display, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware, and interfaces for generating position reporting packets, notifications, pulse or heartbeat signals, or other recurring data transmissions that specify a position of the computer system 900, alone or in combination with other application-specific data, directed toward host 924 or server 930.

Computer system 900 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 902. Transmission media can also take the form of acoustic or light waves, such as those generated during radio-wave and infrared data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to a format that can be read by computer system 900. For instance, a receiver such as a radio frequency antenna or an infrared detector can receive the data carried in a wireless or optical signal and appropriate circuitry can provide the data to I/O subsystem 902 such as place the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to bus 902. Communication interface 918 provides a two-way data communication coupling to network link(s) 920 that are directly or indirectly connected to at least one communication network, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 922 broadly represents a local area network (LAN), wide-area network (WAN), campus network, internetwork, or any combination thereof. Communication interface 918 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic, or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through a network 922 to a host computer 924.

Furthermore, network link 920 may provide a connection through network 922 or to other computing devices via internetworking devices and/or computers that are operated by an Internet Service Provider (ISP) 926. ISP 926 provides data communication services through a worldwide packet data communication network represented as Internet 928. A server computer 930 may be coupled to Internet 928. Server 930 broadly represents any computer, data center, virtual machine, or virtual computing instance with or without a hypervisor or computer executing a containerized program system such as DOCKER or KUBERNETES. Server 930 may represent an electronic digital service that is implemented using more than one computer or instance and that is accessed and used by transmitting web services requests, uniform resource locator (URL) strings with parameters in HTTP payloads, API calls, app services calls, or other service calls. Computer system 900 and server 930 may form elements of a distributed computing system that includes other computers, a processing cluster, a server farm, or other organizations of computers that cooperate to perform tasks or execute applications or services. Server 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 930 may comprise a web application server that hosts a presentation layer, application layer, and data storage layer such as a relational database system using a structured query language (SQL) or no SQL, an object store, a graph database, a flat file system or other data storage.

Computer system 900 can send messages and receive data and instructions, including program code, through the network(s), network link 920, and communication interface 918. In the Internet example, server 930 might transmit a requested code for an application program through Internet 928, ISP 926, local network 922, and communication interface 918. The received code may be executed by processor 904 as it is received, and/or stored in storage 910, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed by one or more computing devices executing one or more sequences of stored program instructions, the computer-implemented method comprising:

initiating execution of an interactive form editor and presenting a graphical user interface and a concurrent display of three or more windows corresponding to a form, data schema, user interface schema, field attributes, and field templates;

receiving a first input specifying to drag and drop two or more data entry fields from a plurality of data entry fields into two or more pages of a multipage form;

in response to the first input, automatically concurrently updating a data schema window to generate and display data schema code corresponding to a coded representation of the two or more data entry fields;

receiving a second input, and in response thereto, exporting the data schema code to a digital file in a digital data storage system;

receiving a third input, and in response thereto, copying the data schema code to a configuration file and adding the configuration file to a digitally stored package;

uploading the digitally stored package to a shared filesystem;

displaying a plurality of toggle widgets that are programmed to respond to a fourth input to specify displaying the data schema code using a JSON syntax or a YAML syntax, without the interactive form editor; and in response to receiving the fourth input, closing a visual display of the form, the field attributes, the plurality of data entry fields, and form data, and opening editors for the data schema code corresponding to the data schema window using the JSON syntax or the YAML syntax.

2. The computer-implemented method of claim 1, the second input comprising a close command or an export command.

3. The computer-implemented method of claim 1, the third input comprising a command to copy the data schema code.

4. The computer-implemented method of claim 1, further comprising, asynchronously with respect to the updating of the data schema window, receiving manual changes to the data schema code, and in response thereto, automatically updating a visual appearance of the multipage form according to updated data schema code.

5. The computer-implemented method of claim 1, further comprising, asynchronously with respect to the updating of the data schema window, receiving updates to the field attributes, and in response thereto, automatically updating a visual appearance of the multipage form according to updated data schema code.

6. The computer-implemented method of claim 1, further comprising, asynchronously with respect to the updating of the data schema window, receiving a fifth input comprising a data entry of a value in a field of the multipage form, and in response thereto, automatically updating a form data window to show a code expression of the value.

7. The computer-implemented method of claim 1, wherein the multipage form comprises at least the data schema, the user interface schema, and the form data.

8. The computer-implemented method of claim 1, further comprising adding a new field to the multipage form by receiving input specifying dragging a template identifier from a template panel and dropping the template identifier on a page of the multipage form, and in response, automatically displaying a default name of the new field in the multipage form and a graphical widget in which data entry can be accepted.

9. The computer-implemented method of claim 1, further comprising:
digitally storing the data schema code and user interface (UI) schema code in main memory in backing stores for the data schema window and UI schema window; and
hiding, from the interactive form editor, the data schema window and the UI schema window while updating the data schema code and the UI schema code in storage in real-time without user involvement.

10. The computer-implemented method of claim 9, further comprising executing converse updates of the multipage form and its visual appearance in response to a fifth input specifying an edit or a change to the data schema code or the UI schema code shown in the data schema window or the UI schema window.

11. The computer-implemented method of claim 1, wherein each data entry field in the multipage form has a plurality of digitally stored attributes comprising at least an internal field name, a screen name or display name of the data entry field, and one or more properties or constraints.

12. The computer-implemented method of claim 9, further comprising:
receiving a fifth input to specify dragging and dropping a field template from a template panel to the multipage form; and
in response thereto, automatically instantiating a field definition in the data schema code in the data schema window, including automatically copying one or more default attributes of the field template into the data schema code.

13. The computer-implemented method of claim 12, further comprising:
receiving a sixth input specifying selecting a field corresponding to the field definition, accessing a field attributes panel, and modifying one or more attributes of the field; and
automatically concurrently updating a visual appearance of the field in the multipage form, in the data schema code in the data schema window, and the UI schema code in the UI schema window.

14. One or more non-transitory computer-readable storage media storing one or more sequences of instructions which, when executed using one or more processors, cause the one or more processors to execute a computer-implemented method of:
initiating execution of an interactive form editor and presenting a graphical user interface and a concurrent display of three or more windows corresponding to a form, data schema, user interface schema, field attributes, and field templates;
receiving a first input specifying to drag and drop two or more data entry fields from a plurality of data entry fields into two or more pages of a multipage form;
in response to the first input, automatically concurrently updating a data schema window to generate and display data schema code corresponding to a coded representation of the two or more data entry fields;
receiving a second input, and in response thereto, exporting the data schema code to a digital file in a digital data storage system;
receiving a third input, and in response thereto, copying the data schema code to a configuration file and adding the configuration file to a digitally stored package;
uploading the digitally stored package to a shared filesystem;
displaying a plurality of toggle widgets that are programmed to respond to a fourth input to specify displaying the data schema code using a JSON syntax or a YAML syntax, without the interactive form editor; and
in response to receiving the fourth input, closing a visual display of the form, the field attributes, the plurality of data entry fields, and form data, and opening editors for the data schema code corresponding to the data schema window using the JSON syntax or the YAML syntax.

15. The non-transitory computer-readable storage media of claim 14, the second input comprising a close command or an export command.

16. The non-transitory computer-readable storage media of claim 14, the third input comprising a command to copy the data schema code.

17. The non-transitory computer-readable storage media of claim 14, further comprising sequences of instructions which, when executed using one or more processors, cause the one or more processors to execute, asynchronously with respect to the updating of the data schema window, receiving manual changes to the data schema code, and in response thereto, automatically updating a visual appearance of the multipage form according to updated data schema code.

18. The non-transitory computer-readable storage media of claim 14, further comprising sequences of instructions which, when executed using one or more processors, cause the one or more processors to execute, asynchronously with respect to the updating of the data schema window, receiving updates to the field attributes, and in response thereto, automatically updating a visual appearance of the multipage form according to updated data schema code.

19. The non-transitory computer-readable storage media of claim 14, further comprising sequences of instructions which, when executed using one or more processors, cause the one or more processors to execute, asynchronously with respect to the updating of the data schema window, receiving a fifth input comprising a data entry of a value in a field of the multipage form, and in response thereto, automatically updating a form data window to show a code expression of the value.

20. The non-transitory computer-readable storage media of claim 14, wherein the multipage form comprises at least the data schema, the user interface schema, and the form data.

21. The non-transitory computer-readable storage media of claim 14, further comprising sequences of instructions which, when executed using one or more processors, cause the one or more processors to execute adding a new field to the multipage form by receiving input specifying dragging a template identifier from a template panel and dropping the template identifier on a page of the multipage form, and in response, automatically displaying a default name of the new field in the multipage form and a graphical widget in which data entry can be accepted.

22. The non-transitory computer-readable storage media of claim 14, further comprising sequences of instructions which, when executed using one or more processors, cause the one or more processors to execute:
digitally storing the data schema code and user interface (UI) schema code in main memory in backing stores for the data schema window and UI schema window; and
hiding, from the interactive form editor, the data schema window and the UI schema window while updating the data schema code and the UI schema code in storage in real-time without user involvement.

23. The non-transitory computer-readable storage media of claim 22, further comprising sequences of instructions which, when executed using one or more processors, cause the one or more processors to execute converse updates of the multipage form and its visual appearance in response to a fifth input specifying an edit or a change to the data schema code or the UI schema code shown in the data schema window or the UI schema window.

24. The non-transitory computer-readable storage media of claim 14, wherein each data entry field in the multipage form has a plurality of digitally stored attributes comprising at least an internal field name, a screen name or display name of the data entry field, and one or more properties or constraints.

25. The non-transitory computer-readable storage media of claim 22, further comprising sequences of instructions which, when executed using one or more processors, cause the one or more processors to execute:
receiving a fifth input to specify dragging and dropping a field template from a template panel to the multipage form; and
in response thereto, automatically instantiating a field definition in the data schema code in the data schema window, including automatically copying one or more default attributes of the field template into the data schema code.

26. The non-transitory computer-readable storage media of claim 25, further comprising sequences of instructions which, when executed using one or more processors, cause the one or more processors to execute:
receiving a sixth input specifying selecting a field corresponding to the field definition, accessing a field attributes panel, and modifying one or more attributes of the field; and
automatically concurrently updating a visual appearance of the field in the multipage form, in the data schema code in the data schema window, and the UI schema code in the UI schema window.

\* \* \* \* \*